US008028800B2

(12) United States Patent  (10) Patent No.: US 8,028,800 B2
Ravnaas  (45) Date of Patent: Oct. 4, 2011

(54) ACOUSTIC DAMPING COMPOSITIONS

(75) Inventor: Brian Ravnaas, West Fargo, ND (US)

(73) Assignee: Saint-Gobain Performance Plastics Rencol Limited, Bristol (GB)

( * ) Notice: Subject to any disclaimer, the term of this patent is extended or adjusted under 35 U.S.C. 154(b) by 0 days.

(21) Appl. No.: 12/757,723

(22) Filed: Apr. 9, 2010

(65) Prior Publication Data

US 2010/0258378 A1    Oct. 14, 2010

Related U.S. Application Data

(60) Provisional application No. 61/168,458, filed on Apr. 10, 2009.

(51) Int. Cl.
    *E04B 1/82* (2006.01)
(52) U.S. Cl. .................... 181/286; 181/284; 428/448
(58) Field of Classification Search ............ 181/286; 428/448
    See application file for complete search history.

(56) References Cited

U.S. PATENT DOCUMENTS

| | | | |
|---|---|---|---|
| 3,489,242 A | 1/1970 | Gladding et al. | |
| 3,615,961 A | 10/1971 | Meyer | |
| 3,658,635 A | 4/1972 | Eustice | |
| 3,770,560 A | 11/1973 | Elder et al. | |
| 3,894,169 A | 7/1975 | Miller | |
| 4,299,639 A | 11/1981 | Bayer | |
| 4,416,790 A * | 11/1983 | Schurmann et al. | 252/62 |
| 5,102,924 A | 4/1992 | Williams et al. | |
| 5,318,837 A | 6/1994 | Yoshinaka et al. | |
| 5,400,296 A | 3/1995 | Cushman et al. | |
| 5,691,021 A | 11/1997 | Kobe | |
| 5,858,521 A * | 1/1999 | Okuda et al. | 428/219 |
| 5,923,002 A | 7/1999 | McGrath et al. | |
| 6,006,484 A | 12/1999 | Geissbuhler | |
| 6,022,616 A | 2/2000 | Wu et al. | |
| 6,060,553 A | 5/2000 | Lenczyk et al. | |
| 6,077,613 A | 6/2000 | Gaffigan | |
| 6,211,320 B1 | 4/2001 | Dershem et al. | |
| 6,267,347 B1 | 7/2001 | Ryan et al. | |
| 6,319,969 B1 | 11/2001 | Walther et al. | |
| 6,498,547 B2 | 12/2002 | Morita | |
| 6,528,563 B2 | 3/2003 | Kaiser et al. | |
| 6,789,645 B1 | 9/2004 | Deblander | |
| 6,920,723 B2 | 7/2005 | Downey | |
| 7,019,102 B2 | 3/2006 | Schoenfeld et al. | |
| 7,022,746 B2 * | 4/2006 | Lockwood et al. | 521/174 |

(Continued)

FOREIGN PATENT DOCUMENTS

DE    102004016099 A1    10/2005

(Continued)

OTHER PUBLICATIONS

Texanol, Case No. 25265-77-4; UNEP Publications; IRPTC Data Profile, Identifiers, Physical and Chemical Properties pp. 73-117.

(Continued)

*Primary Examiner* — Forrest M Phillips
(74) *Attorney, Agent, or Firm* — Abel Law Group, LLP; Chi Suk Kim

(57) ABSTRACT

An acoustic damping composition includes a binder resin including an addition polymer having a carboxylic functional group and a urethane component. The acoustic damping composition has a Mode 1 Damping Parameter of at least 0.45.

20 Claims, 1 Drawing Sheet

U.S. PATENT DOCUMENTS

| | | | |
|---|---|---|---|
| 7,025,852 | B2 | 4/2006 | Kumakura |
| 7,094,811 | B2 | 8/2006 | Nodelman et al. |
| 7,181,891 | B2 * | 2/2007 | Surace et al. ............... 52/642 |
| 7,263,028 | B2 | 8/2007 | Thomas et al. |
| 2001/0009393 | A1 | 7/2001 | Morita |
| 2001/0018228 | A1 | 8/2001 | Kumakura |
| 2002/0004538 | A1 | 1/2002 | Kaiser et al. |
| 2002/0037381 | A1 | 3/2002 | Ohira et al. |
| 2002/0160131 | A1 | 10/2002 | Ohira et al. |
| 2003/0207491 | A1 | 11/2003 | Kumakura |
| 2004/0082721 | A1 | 4/2004 | Miura et al. |
| 2004/0113483 | A1 | 6/2004 | Sylvester et al. |
| 2005/0126851 | A1 | 6/2005 | Ikebe et al. |
| 2006/0052474 | A1 * | 3/2006 | Czerny ........................ 522/79 |
| 2006/0118355 | A1 | 6/2006 | Blomeling et al. |
| 2006/0154078 | A1 * | 7/2006 | Watanabe et al. .......... 428/413 |
| 2006/0165977 | A1 | 7/2006 | Rehfeld et al. |
| 2006/0173103 | A1 | 8/2006 | Schmidt |
| 2006/0183858 | A1 | 8/2006 | Takesada et al. |
| 2006/0214341 | A1 * | 9/2006 | Sugiura et al. ............. 267/293 |
| 2007/0012509 | A1 | 1/2007 | Shimada et al. |
| 2007/0065668 | A1 * | 3/2007 | Idei ........................... 428/411.1 |
| 2007/0101679 | A1 | 5/2007 | Harthcock et al. |
| 2007/0160851 | A1 | 7/2007 | Barancyk et al. |
| 2008/0001431 | A1 | 1/2008 | Thompson et al. |
| 2008/0083497 | A1 | 4/2008 | Dublineau et al. |
| 2008/0153969 | A1 | 6/2008 | Hermes et al. |
| 2008/0249241 | A1 | 10/2008 | Heiliger et al. |
| 2008/0250751 | A1 | 10/2008 | Pavan et al. |
| 2009/0013506 | A1 | 1/2009 | Mizuhara et al. |
| 2010/0230206 | A1 | 9/2010 | Tinianov et al. |

FOREIGN PATENT DOCUMENTS

| | | | |
|---|---|---|---|
| EP | 0621931 | B1 | 7/1997 |
| EP | 0897675 | A1 | 2/1999 |
| EP | 0588563 | B1 | 3/1999 |
| EP | 0965701 | A1 | 12/1999 |
| EP | 1031671 | A2 | 8/2000 |
| EP | 0966495 | B1 | 7/2002 |
| EP | 1408075 | A1 | 4/2004 |
| EP | 1161494 | B1 | 4/2005 |
| EP | 1160387 | B1 | 9/2005 |
| GB | 970392 | | 9/1964 |
| GB | 2136063 | A | 9/1984 |
| SU | 382201 | A1 | 7/1973 |
| WO | 9208856 | | 5/1992 |
| WO | 9315333 | A2 | 8/1993 |
| WO | 9520820 | | 8/1995 |
| WO | 9731549 | | 9/1997 |
| WO | 9733051 | | 9/1997 |
| WO | 9919398 | | 4/1999 |
| WO | 9924520 | | 5/1999 |
| WO | 0048832 | A1 | 8/2000 |
| WO | 0049085 | A1 | 8/2000 |
| WO | 0069946 | | 11/2000 |
| WO | 0109078 | A1 | 2/2001 |
| WO | 0116231 | A1 | 3/2001 |
| WO | 0123466 | A1 | 4/2001 |
| WO | 0139969 | A1 | 6/2001 |
| WO | 0144136 | A1 | 6/2001 |
| WO | 0220687 | A2 | 3/2002 |
| WO | 02061010 | A2 | 8/2002 |
| WO | 03087252 | A1 | 10/2003 |
| WO | 2004063268 | A1 | 7/2004 |
| WO | 2005035679 | A2 | 4/2005 |
| WO | 2005100709 | A1 | 10/2005 |
| WO | 2005118733 | A1 | 12/2005 |
| WO | 2006032802 | A1 | 3/2006 |
| WO | 2006092560 | A1 | 9/2006 |
| WO | 2006116440 | A2 | 11/2006 |
| WO | 2006131138 | A1 | 12/2006 |
| WO | 2007017422 | A2 | 2/2007 |
| WO | 2007019450 | A1 | 2/2007 |
| WO | 2007053410 | A1 | 5/2007 |
| WO | 2007054699 | A2 | 5/2007 |
| WO | 2007070771 | A1 | 6/2007 |
| WO | 2007084318 | A2 | 7/2007 |
| WO | 2007149613 | A1 | 12/2007 |
| WO | 2008002842 | A1 | 1/2008 |
| WO | 2008005936 | A2 | 1/2008 |
| WO | 2008057664 | A2 | 5/2008 |
| WO | 2008115301 | A2 | 9/2008 |

OTHER PUBLICATIONS

Zheng, Zhu et al.; "Elastomeric Reactive Microgels as Toughner for Epoxy Adhesives," Chinese Journal of Polymer Science, 1987, vol. 5, pp. 76-80.

* cited by examiner

ACOUSTIC DAMPING COMPOSITIONS

CROSS-REFERENCE TO RELATED APPLICATION(S)

The present application claims priority from U.S. Provisional Patent Application No. 61/168,458, filed Apr. 10, 2010, entitled "ACOUSTIC DAMPING COMPOSITIONS," naming inventor Brian Ravnaas, which application is incorporated by reference herein in its entirety.

FIELD OF THE DISCLOSURE

This disclosure, in general, relates to acoustic damping compositions, construction materials formed using such acoustic damping compositions, and methods of using acoustic damping compositions.

BACKGROUND

Noise control has long been an issue in residential and business settings. With increasing urbanization and an increasing cost of real estate, individuals are living and working in closer proximity, increasing the need for noise reduction, particularly in high rise and apartment settings. To combat noise in such urban settings, several cities, states and countries have implemented noise control building codes. Further, many building owners specify noise tolerance in construction specifications during construction.

However, many conventional methods for controlling noise are either cumbersome to install or ineffective. Particularly in the case of walls, conventional techniques include the use of resilient members disposed between a wall panel and a support. Such resilient members can be difficult to install and are expensive. Other conventional methods include the installation of thick insulative members which have limited effectiveness and add additional steps to the installation and construction of walls or ceilings.

Another technique used for controlling noise is the use of a damping material between layers of construction material, such as plywood or drywall. Such damping materials are also referred to as constrained layer damping materials. However, conventional damping materials provide limited sound control for particular noise.

As such, an improved acoustic damping composition would be desirable.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
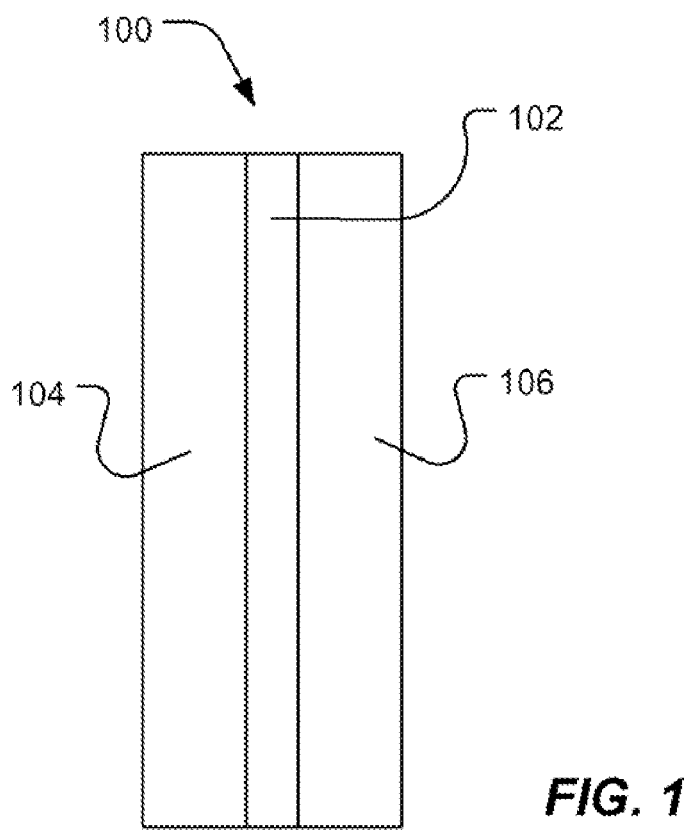
FIG. 1 includes and illustration of an exemplary construction panel.

In a particular embodiment, an acoustic damping composition includes a binder resin and a modifying resin. In an example, the binder resin is an addition polymer having a carboxylic functional group. For example, the binder resin may be an acrylic component. The modifying resin may include a urethane component. The acoustic damping composition has a Mode 1 Damping Parameter of at least 0.45. In addition, the acoustic damping composition may have a Mode 2 Damping Parameter of at least 0.27 or a Mode 3 Damping Parameter of at least 0.27. Such an acoustic damping composition may be incorporated into a construction panel, for example, between two rigid panels.

In an example, the acoustic damping composition may be extruded on a first major surface of a first rigid panel. A first major surface of a second rigid panel may be contacted with the acoustic damping composition to form a laminate that may be used in the construction of walls, ceilings, or floors. In particular, the acoustic damping composition may be formulated as a water-based emulsion including the binder resin and modifying resin. When applied, the water of the water-based emulsion may evaporate to leave the binder resin and modifying resin of the acoustic damping composition.

In an exemplary embodiment, the binder resin is an addition polymer having a carboxylic functional group, such as a carboxylic acid or an ester derivative functional group. An addition polymer is a polymer formed through addition polymerization as opposed to condensation polymerization. In an example, the binder resin is formed from a monomer, such as acrylic acid, methyl methacrylate, ethyl methacrylate, methacrylate, methyl acrylate, ethyl acrylate, vinyl acetate, derivatives thereof, or any combination thereof. For example, the binder resin may include polyvinyl acetate, a derivative thereof, or a copolymer thereof. In a further example, the polyvinyl acetate may be modified, such as through hydroxylization to form a copolymer poly(vinyl acetate-co-vinyl alcohol).

In another example, the binder resin may be an acrylic resin. The acrylic resin may have an alkyl group having from 1-4 carbon atoms, a glycidyl group or a hydroxyalkyl group having from 1-4 carbon atoms. Representative acrylic polymers include polyacrylate, polymethyl methacrylate, polyethyl methacrylate, polybutyl methacrylate, polyglycidyl methacrylate, polyhydroxyethyl methacrylate, polymethyl acrylate, polyethyl acrylate, polybutyl acrylate, polyglycidyl acrylate, polyhydroxyethyl acrylate, or any combination thereof. In a particular example, the acrylic resin is in the form of an emulsion, such as a water-based emulsion. For example, the acrylic resin may be an adhesive acrylic resin, such as a pressure-sensitive adhesive acrylic resin.

In particular, the binder resin has a low glass transition temperature. For example, the glass transition temperature of the binder resin may be not greater than −25° C. In an example, the glass transition temperature is not greater than −40° C., such as not greater than −50° C. Further, the glass transition temperature of the binder resin may be not greater than −60° C.

In addition, the binder resin may have a molecular weight of at least 8,000 atomic units, such as at least 10,000 atomic units, at least 20,000 atomic units, or even as high as 25,000 atomic units or higher. In particular, the average molecular weight of the binder resin is not greater than 100,000 atomic units. In a particular embodiment, the binder resin is a viscoelastic resin, exhibiting a hysteresis on a stress versus strain graph.

In addition, the acoustic damping composition includes a modifying resin. The modifying resin may be an acrylic resin, a urethane resin, an epoxy resin, an acrylate/amine resin, or any combination thereof. In general, the modifying resin is self-dispersible in aqueous emulsions and is immiscible with the binder resin.

In a particular embodiment, the modifying resin is a urethane resin formed from reactants including isocyanate, an ether alcohol, and an ester alcohol. In a particular embodiment, the isocyanate component includes a diisocyanate monomer. An exemplary diisocyanate monomer may include toluene diisocyanate, m-phenylene diisocyanate, p-phenylene diisocyanate, xylene diisocyanate, 4,4'-diphenylmethane diisocyanate, hexamethylene diisocyanate, isophorone diisocyanate, polymethylene polyphenyl diisocyanate, 3,3'-dimethyl-4,4'-biphenylene diisocyanate, 3,3'-dimethyl-4,4'-diphenylmethane diisocyanate, 3,3'-dichloro-4,4'-biphenylene diisocyanate, or 1,5-naphthalene diisocyanate; their modified products, for instance, carbodiimide-modified products; or the like, or any combination thereof. Such diisocyanate monomers may be used alone or in admixture of at least two kinds. In a particular example, the isocyanate component may include methylene diphenyl diisocyanate (MDI), toluene diisocyanate (TDI), hexamethylene diisocyanate (HDI), isophorone diisocyanate (IPDI), or any combination thereof. In an example, the isocyanate may include methylene diphenyl diisocyanate (MDI) or toluene diisocyanate (TDI). In particular, the isocyanate includes methylene diphenyl diisocyanate (MDI).

In an example, the isocyanate forms 10 wt % to 50 wt % of the reactants that form the urethane component. For example, the isocyanate may form 20 wt % to 40 wt % of the reactants, such as 25 wt % to 35 wt % of the reactants.

In an example, the ether alcohol may include a polyether polyol or an alkoxy derivative thereof. A suitable polyether polyol useful for production of the modifying resin can be produced by polyinsertion via double metal cyanide (DMC) catalysis of alkylene oxides, by anionic polymerization of alkylene oxides in the presence of alkali hydroxides or alkali alcoholates as catalysts and with the addition of at least one initiator molecule containing 2 to 6, preferably 2 to 4, reactive hydrogen atoms in bonded form, or by cationic polymerization of alkylene oxides in the presence of Lewis acids, such as antimony pentachloride or boron fluoride etherate. A suitable alkylene oxide may contain 2 to 4 carbon atoms in the alkylene radical. An example includes tetrahydrofuran, 1,2-propylene oxide, 1,2- or 2,3-butylene oxide; ethylene oxide, 1,2-propylene oxide, or any combination thereof. The alkylene oxides can be used individually, in succession, or as a mixture. In particular, mixtures of 1,2-propylene oxide and ethylene oxide may be used, whereby the ethylene oxide is used in quantities of 10% to 50% as an ethylene oxide terminal block so that the resulting polyols display over 70% primary OH terminal groups. An example of an initiator molecule includes water or dihydric or trihydric alcohols, such as ethylene glycol, 1,2-propanediol and 1,3-propanediol, diethylene glycol, dipropylene glycol, ethane-1,4-diol, glycerol, trimethylol propane, or any combination thereof.

Suitable polyether polyols, such as polyoxypropylene polyoxyethylene polyols, have average functionalities of 1.6 to 2.4, such as 1.8 to 2.4, and number-average molecular weights of 800 g/mol to 25,000 g/mol, such as 800 g/mol to 14,000 g/mol, particularly 2,000 g/mol to 9,000 g/mol. Difunctional or trifunctional polyether polyols having a number-average molecular weight of 800 g/mol to 25,000 g/mol, such as 800 g/mol to 14,000 g/mol, or even 2,000 g/mol to 9,000 g/mol, may be used as polyol components.

In a particular example, the polyether polyol includes polyethylene glycol, methoxy derivatives thereof, ethoxy derivatives thereof, or any combination thereof. The polyethylene glycol or derivative thereof may include between 3 and 20 ethylene glycol units, such as between 5 and 20 ethylene glycol units, or even between 5 and 15 ethylene glycol units. Further, the ether alcohol may include blends of polyethylene glycol or derivatives thereof having a different number of ethylene glycol units. Another exemplary ether alcohol includes phenyl alcohol-based glycol ethers.

In another example, the ether alcohol component may include a polypropylene glycol alkyl ether. In an example, the polypropylene glycol alkyl ether may include dipropylene glycol n-butyl ether, tripropylene glycol n-butyl ether, or any combination thereof.

In a particular embodiment, the reactants that form the polyurethane include at least 15% by weight of the dipropylene glycol n-butyl ether. For example, the reactants may include at least 20% by weight of the dipropylene glycol n-butyl ether, such as at least 25% by weight of the dipropylene glycol n-butyl ether. In particular, the reactants may include not greater than 50% by weight of the dipropylene glycol n-butyl ether. Further, the reactants may include tripropylene glycol n-butyl ether in an amount in a range of 0% to 30% by weight, such as a range of 5% to 20% by weight, or even a range of 10% to 20% by weight. When the reactants that form the polyurethane include both dipropylene glycol n-butyl ether and tripropylene glycol n-butyl ether, the components may be included in a ratio (dipropylene glycol n-butyl ether/tripropylene glycol n-butyl ether) of at least 0.5, such as at least 1.0, or even at least 1.5. Alternatively, the reactants may include tripropylene glycol n-butyl ether as the only polypropylene glycol alkyl ether.

In addition, the reactants of the urethane resin may include an ester alcohol. For example, the ester alcohol may be a polyester polyol. In an exemplary embodiment, a polyester polyol is derived from dibasic acids such as adipic, glutaric, fumaric, succinic or maleic acid, or anhydrides and di-functional alcohols, such as ethylene glycol, diethylene glycol, propylene glycol, di or tripropylene glycol, 1-4 butane diol, 1-6 hexane diol, or any combination. For example, the polyester polyol may be formed by the condensation reaction of the glycol and the acid with the continuous removal of the water by-product. A small amount of high functional alcohol, such as glycerin, trimethanol propane, pentaerythritol, sucrose or sorbitol or polysaccharides may be used to increase branching of the polyester polyol. The esters of simple alcohol and the acid may be used via an ester interchange reaction where the simple alcohols are removed continuously like the water and replaced by one or more of the glycols above. Additionally, polyester polyols may be produced from aromatic acids, such as terephthalic acid, phthalic acid, 1,3,5-benzoic acid, their anhydrides, such as phthalic anhydride.

In a particular example, the ester alcohol may include an alkyl diol alkyl ester. For example, the alkyl diol alkyl ester may include trimethyl pentanediol isobutyrate, such as 2,2,4-trimethyl-1,3-pentanediol isobutyrate. In particular, desirable acoustic damping is observed when the ester alcohol includes trimethyl pentanediol isobutyrate and the ether alcohol includes dipropylene glycol n-butyl ether. Alternatively, advantages are exhibited when the ester alcohol includes trimethyl pentanediol isobutyrate and the ether alcohol includes dipropylene glycol n-butyl ether and tripropylene glycol n-butyl ether. In an exemplary embodiment, the reactants may include the ester alcohol, such as the alkyl diol alkyl ester, in a range of 1.0 wt % to 8.0 wt %, such as a range of 2.0 wt % to 6.0 wt %.

In a particular embodiment, the acoustic damping composition includes a binder resin and modifying resin that are immiscible. For example, the binder resin and modifying resin form separate phases when dried as a film. In particular, the acoustic damping composition may have a haze value as measured by ASTM D1003 (method B) of at least 30%, such as at least 50%.

In the acoustic damping composition, the binder resin and modifying resin may be included in a ratio (binder resin/modifying resin) in a range between 0.5 and 1.5. For example, the range may be between 0.8 and 1.3. In particular, the binder resin is an acrylic component and the modifying resin is a urethane component. As such, the ratio of acrylic component to urethane component is in a range between 0.5 and 1.5, such as a range between 0.8 and 1.3.

In an exemplary embodiment, the acoustic damping composition may be prepared as a water-based emulsion including the binder resin and modifying resin. In an example, the solids content of the water-based emulsion, including the binder resin and modifying resin, is at least 40%. For example, the solids content of the water-based emulsion may be at least 50%, such as least 60%, or even at least 65%. In addition, the water-based emulsion may have a desirable pH. For example, the pH may be in a range of 6.8 to 8.0, such as in a range of 7.0 to 7.5.

Further, the water-based emulsion may have a viscosity in a range of 1,000 cps to 500,000 cps. For example, the viscosity may be in a range of 1,000 cps to 100,000 cps, such as a range of 5,000 cps to 50,000 cps, as measured with a #6 spindle at 10 rpm. In particular, the viscosity may be in a range of 10,000 cps to 40,000 cps, such as a range of 20,000 cps to 35,000 cps. To control the viscosity, a thickening agent may be added to the water-based emulsion. For example, the thickener may be an anionic thickener or a nonionic thickener. In a further example, the thickener may be a cellulose-based or modified cellulose-based thickener, an associative thickener, an inverse emulsion thickener, or an alkali swellable emulsion thickener. Compositionally, the thickener may include polyacrylate or polymethacrylate, carboxylate, polyvinyl alcohol, polyacrylamide, or any combination thereof. In a particular example, the thickener includes an acrylate thickener. Further, the thickener may have an average molecular weight in a range of 30,000 to 70,000 atomic units, such as a range of 40,000 to 55,000 atomic units. The thickener may be included in an amount 0.1 wt % to 5 wt %.

Once deployed and dried, the acoustic damping composition exhibits desirable acoustic damping, such as a desirable Mode 1 Damping Parameter, a Mode 2 Damping Parameter, or a Mode 3 Damping Parameter. The Mode 1 Damping Parameter, Mode 2 Damping Parameter, and Mode 3 Damping Parameter are defined below in relation to the specified testing method of the Examples. In an example, the acoustic damping composition may have a Mode 1 Damping Parameter of at least 0.45. For example, the Mode 1 Damping Parameter may be at least 0.5, such as at least 0.55, at least 0.6, at least 0.65, or even at least 0.7. Further, the acoustic damping composition may have a Mode 2 Damping Parameter of at least 0.27, such as at least 0.30, or even at least 0.32. In addition, the acoustic damping composition may have a Mode 3 Damping Parameter of at least 0.27, such as at least 0.31.

In a further example, the acoustic damping composition may exhibit a desirable Damping Performance, defined as the percent increase in mode Damping Parameter determined in accordance with the testing method specified in the Examples relative to Green Glue as commercially available in August 2008 from The Green Glue Company of West Fargo, N. Dak. For example, the acoustic damping composition may have a Mode 1 Damping Performance of at least 20%, such as at least 30%, at least 40%, at least 50% or even at least 60%. In another example, the acoustic damping composition may have a Mode 2 Damping Performance of at least 20%, such as at least 30%, at least 40%, or even at least 50%. In an additional example, the acoustic damping composition may have a Mode 3 Damping Performance of at least 10%.

In addition, the acoustic damping composition may include a ceramic particulate having an average particle size of not greater than 100 micrometers. For example, the acoustic damping composition may include not greater than 50 wt % of the ceramic particulate, such as between 2 wt % and 25 wt % of the ceramic particulate. In an example, the ceramic particulate has an average particle size of not greater than 50 micrometers, such as not greater than 25 micrometers, or even not greater than 10 micrometers. In a particular example, the average particle size of the ceramic particulate may be less than 1 micrometer, such as less than 100 nanometers. For example, the ceramic particulate may include an aluminous ceramic, such as alumina trihydrate. In another example, the ceramic particulate may include silica, zirconia, titania, alumina, or any combination thereof.

In use, the acoustic damping composition may be disposed between two relatively flat rigid members. For example, the acoustic damping composition may be laminated between two rigid panels to form a construction panel for use in forming walls, ceilings, or floors. For example, the rigid panels may include wood, plywood, gypsum board, cement board, plaster board, wallboard, gyproc, sheetrock, or any combination thereof. In an example, the acoustic damping composition may be used to form a laminate for manufacturing walls. In another example, the acoustic damping composition may be disposed between subflooring and flooring. In a further example, the acoustic damping composition may be disposed between rigid members of a ceiling panel.

For example, as illustrated in FIG. 1, an acoustic damping composition layer 102 is disposed between a first rigid panel member 104 and a second rigid panel member 106. In particular, when disposed between the two rigid panels (104 and 106), the acoustic damping composition may have a thickness in a range of 25 micrometers to 5 millimeters, such as a range of 100 micrometers to 5 millimeters, a range of 500 micrometers to 5 millimeters, or even a range of 1 millimeter to 5 millimeters. Alternatively, or in addition, an additional layer (not illustrated) of acoustic damping composition may be applied to the second major surface of the rigid panel 106. Another rigid panel (not illustrated) may be applied in contact with the second layer of acoustic damping composition to form a three rigid member panel with two acoustic composition layers.

In particular, preformed laminates may be formed using the acoustic damping composition. For example, the acoustic damping composition may be applied to a surface of a first rigid panel. The surface of the second rigid panel is placed in contact with the acoustic damping composition that is in contact with a major surface with the first rigid panel to form the laminate.

In a further example, the acoustic damping composition exhibits a sound transmission class (STC) improvement of at least 10 points relative to a similar construction in which no damping composition is utilized when the acoustic damping composition applied between layers of ½" or ⅝" drywall on a staggered wood stud wall construction with 3½" R-13 fiberglass insulation where 2 layers of drywall are used on each side of the construction and where the damping composition is applied between each set of drywall layers disposed on opposite sides of the wall assembly. No damping material is used in the reference sample. Sound transmission class (STC) is determined in accordance with ASTM E90 and ASTM E413. As used herein, the STC Performance is the difference in STC measured in accordance with ASTM E90 and E413 using the damping composition disposed between layers of ⅝" drywall as described above, relative to the same construction absent the damping material. In particular, the STC Performance may be at least 10, such as at least 11, at least 12, or even at least 13.

Particular embodiments of the above described acoustic damping composition exhibit technical advantages. In particular, embodiments of the above described exhibit desirable damping of Mode 1, Mode 2 and Mode 3 vibrations.

EXAMPLES

Each of the acoustic damping compositions described below are tested for damping of Mode 1, Mode 2, and Mode 3 vibrations. In particular, the test procedure is described below. The output of the procedure provides Damping Parameters for Mode 1, Mode 2, and Mode 3 vibrations, respectively defined as the Mode 1 Damping Parameter, the Mode 2 Damping Parameter, and the Mode 3 Damping Parameter. As defined herein, Mode 1 is the fundamental mode of the long dimension of the test panel, Mode 2 is the 2nd order mode of the long dimension of the test panel, and Mode 3 is the fundamental mode of the narrow dimension of the panel.

To test the formulations, each formulation is applied between two layers of ½ inch thick drywall having dimensions 8"×24" to form a panel. The formulations are applied using a 3/16 inch plastic V notch trowel. The panels are dried for approximately 30 days.

Figure 2:
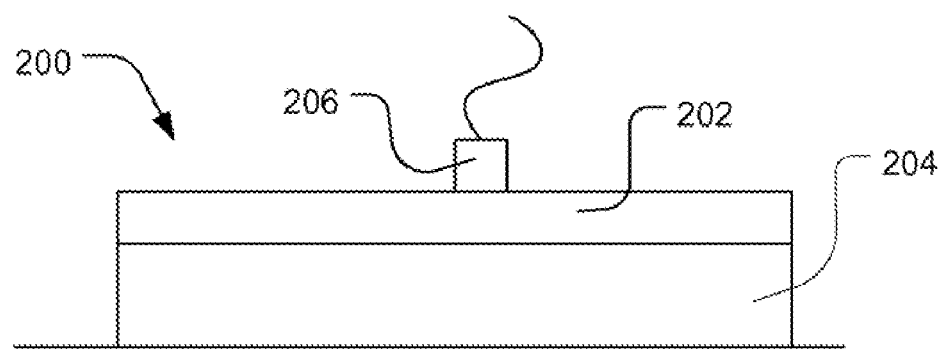
FIG. 2 includes an illustration of an acoustic testing apparatus.

To test the panels, the panel 202 is placed on a 2-inch thick pad of low density/low modules open cell polyurethane acoustic foam 204 having a density of approximately 1.7 lb/cuft, as illustrated in FIG. 2. An accelerometer 206 (Measurement Specialties ACH-01 piezoelectric accelerometer or equivalent having a resonant frequency significantly greater than the frequency range 20 Hz-500 Hz) is placed in the center of the panel. The panel is struck a total of at least 12 times and the resulting impulses are recorded and saved. Three of the twelve impulses are selected at random and analyzed. The impulse response is analyzed using a fast Fourier transform techniques to identify three modes of vibration using a fast Fourier transform software or a system, such as a Bruel & Kjaer Pulse system. A three decibel rule is applied to determine the damping factor. For each mode, the damping factor of at least three selected responses are arithmetically averaged to yield a damping parameter. The Mode 1 Damping Parameter is the damping parameter for Mode 1. The Mode 2 Damping Parameter is the damping parameter for Mode 2. The Mode 3 Damping Parameter is the damping parameter for Mode 3.

While the low density/low modulus open cell polyurethane foam may contribute to some damping, the damping contribution of the foam is not more than 0.01 and as such, is determined to be low enough to not affect the results of the experiments below.

Example 1

Formulations are prepared from water-based emulsions having a 62% solids content. Each formulation includes 100 parts binder resin (Flexacryl AF-2027, available from Air Products), 90 parts of a modifying resin described in Table 1, and 45 parts water. Each formulation is thickened to approximately 30,000 cps as measured with a #6 spindle at 10 rpm. The viscosity is adjusted using Texipol 237, available from Scott Bader, UK. Ammonia is used to raise the pH to between 7 and 7.5.

TABLE 1

Sample Compositions

| Component | #1 | #2 | #3 | #4 | #5 | #6 | #7 | #8 | #9 |
|---|---|---|---|---|---|---|---|---|---|
| TPnB | 240 | 120 | 0 | 145 | 176 | 176 | 360 | 400 | 240 |
| DPnB | 240 | 240 | 360 | 288 | 176 | 176 | 0 | 0 | 120 |
| Texanol | 0 | 40 | 40 | 0 | 40 | 20 | 40 | 0 | 40 |
| Carbowax 550 | 91 | 78 | 80 | 86 | 75 | 72 | 76 | 76 | 80 |
| MDI | 319 | 278 | 296 | 301 | 261 | 248 | 238 | 238 | 258 |

Numbers represent grams of component
TPnB—tripropylene glycol n-butyl ether
DPnB—dipropylene glycol n-butyl ether
Texanol—trimethyl pentanediol isobutyrate, available from Eastman Chemical Company
Carbowax 550—methoxy terminated polyethylene glycol available from Dow Chemical Company
MDI—methylene diphenyl diisocyanate

TABLE 2

Mode Frequencies for Sample Compositions

| | Mode Frequency (Hz) | | | | | | | | |
|---|---|---|---|---|---|---|---|---|---|
| | #1 | #2 | #3 | #4 | #5 | #6 | #7 | #8 | #9 |
| Mode 1 | 123.67 | 123.33 | 135.33 | 129.00 | 125.00 | 124.00 | 121.00 | 116.67 | 124.50 |
| Mode 2 | 432.67 | 429.67 | 473.67 | 448.00 | 428.00 | 424.00 | 418.00 | 421.67 | 425.33 |
| Mode 3 | 981.67 | 956.33 | 1006.33 | 974.00 | 945.33 | 945.33 | 929.67 | 947.00 | 947.33 |

TABLE 3

Mode Damping Parameters for Sample Compositions

| | Mode Damping Parameter | | | | | | | | |
|---|---|---|---|---|---|---|---|---|---|
| | #1 | #2 | #3 | #4 | #5 | #6 | #7 | #8 | #9 |
| Mode 1 | 0.61 | 0.76 | 0.62 | 0.67 | 0.75 | 0.69 | 0.70 | 0.58 | 0.70 |
| Mode 2 | 0.35 | 0.34 | 0.39 | 0.36 | 0.32 | 0.33 | 0.30 | 0.31 | 0.34 |
| Mode 3 | 0.30 | 0.30 | 0.34 | 0.31 | 0.30 | 0.30 | 0.27 | 0.27 | 0.29 |

Table 2 illustrates the mode frequencies for each sample, and Table 3 illustrates the damping parameter for each sample. The Texanol component provides improvement in Mode 1 damping. In particular, those samples including Texanol exhibit an average Mode 1 Damping Parameter of 0.7, while those samples without Texanol exhibit an average Mode 1 Damping Parameter of 0.62. In addition, the presence of DPnB provides some advantages, as does the combination of DPnB with TPnB. For example, formulas with the combination of DPnB and TPnB exhibit an average Mode 1 damping of 0.7 compared to an average Mode 1 damping of 0.63 without the combination. Further, the presence of DPnB correlates well with Mode 2 damping. Furthermore, the combination of DPnB, TPnB and Texanol provides and average Mode 1 Damping Parameter of 0.73, while formulas not having this entire combination average 0.64.

Example 2

Three samples are prepared having different solids content. The formulations are thickened with Texipol 253, available from Scott Bader, UK. Table 4 illustrates the resonance frequencies for the Modes 1, 2 and 3.

TABLE 4

Mode Frequencies for Sample Compositions

| | Mode Frequency (Hz) | | |
|---|---|---|---|
| | 58% solids | 65% solids | 72% solids |
| Mode 1 | 122.00 | 116.00 | 114.00 |
| Mode 2 | 422.00 | 399.00 | 397.00 |
| Mode 3 | 920.00 | 908.00 | 889.00 |

As the solid content increases, the location of the resonance modes appears to drop in frequency, implying a softer damping film. Such an effect may also reflect changes in the thickness of the damping film. While the same trowel is used for each sample, the higher solids samples have slightly thicker films. Thicker films tend to translate to softer film, all things being equal.

TABLE 5

Mode Damping for Sample Compositions

| | Mode Damping | | |
|---|---|---|---|
| | 58% solids | 65% solids | 72% solids |
| Mode 1 | 0.64 | 0.70 | 0.74 |
| Mode 2 | 0.39 | 0.34 | 0.32 |
| Mode 3 | 0.33 | 0.36 | 0.30 |

Table 5 illustrates the effect of damping for each of the modes. As illustrated, the Mode 1 Damping Parameter increases with increasing solids content. However, Mode 3 damping appears to decrease with increasing solids content while the Mode 3 Damping Parameter undergoes a maximum around 65% solids.

Example 3

Samples are prepared using different thickeners. In particular, samples are prepared using Texipol 253, Texipol 237, and Texipol 258, available from Scott Bader, UK. The samples are prepared in accordance with Sample 3 of Example 1.

TABLE 6

Mode Frequencies for Sample Compositions

| | Mode Frequency (Hz) | | |
|---|---|---|---|
| | Texipol 253 | Texipol 237 | Texipol 258 |
| Mode 1 | 120 | 122 | 121 |
| Mode 2 | 422 | 442 | 417 |
| Mode 3 | 920 | 965 | 914 |

TABLE 7

Mode Damping for Sample Compositions

| | Mode Damping | | |
|---|---|---|---|
| | Texipol 253 | Texipol 237 | Texipol 258 |
| Mode 1 | 0.64 | 0.53 | 0.54 |
| Mode 2 | 0.39 | 0.42 | 0.40 |
| Mode 3 | 0.33 | 0.36 | 0.35 |

As illustrated in Table 6, only slight differences are exhibited in the resonance frequencies of the modes. As illustrated in Table 7, the thickener provides a large change in damping parameter, particularly the Mode 1 Damping Parameter.

Example 4

Commercially available acoustic damping compositions are tested for comparison with a sample formed in a manner similar to the samples of Example 1. The samples are tested using the testing method described above with the exception that the test panel is suspended instead of placing it on the foam. Three different samples of QuietGlue® formulations that were acquired over a period of 2 years between 2006 and 2008 are tested. QuietGlue® is commercially available from Quiet Solution of Sunnyvale, Calif. In addition, Green Glue acquired August 2008, available from Green Glue Company of West Fargo, N. Dak., is tested. As illustrated in Table 8, each of the commercially available compositions has a Mode 1 Damping Parameter 0.38 or less. In addition, the samples exhibit low Mode 2 Damping Parameters and low Mode 3 Damping Parameters. In contrast, the sample formed in a manner similar to the samples of Example 1 exhibits a Mode 1 Damping Parameter of at least 0.62 and a Mode 2 Damping Parameter of at least 0.42, far exceeding the damping parameters of the commercially available compositions. In particular, a Damping Performance, defined as the percent increase in damping parameter relative to the Green Glue product as of August 2008, is at least 20% for Mode 1 and Mode 2, such as at least 30%, at least 40%, or even at least 50%.

TABLE 8

Mode Damping for Commercial Products

| | Mode Damping | | | | |
|---|---|---|---|---|---|
| | QuietGlue® (First Sample) | QuietGlue® (Second Sample) | QuietGlue® (Third Sample) | Green Glue | Sample |
| Mode 1 | 0.04 | 0.12 | 0.09 | 0.38 | 0.62 |
| Mode 2 | 0.09 | 0.21 | 0.18 | 0.28 | 0.42 |
| Mode 3 | 0.11 | 0.24 | 0.21 | 0.31 | 0.34 |

In a first embodiment, an acoustic damping composition includes a binder resin including an addition polymer having a carboxylic functional group and a urethane component. The acoustic damping composition has a Mode 1 Damping Parameter of at least 0.45. For example, the Mode 1 Damping Parameter may be at least 0.5, at least 0.55, at least 0.6, at least 0.65, or at least 0.7. In another example of the first embodiment, the acoustic damping composition has a Mode 2 Damping Parameter of at least 0.27, such as at least 0.30, or at least 0.32. In a further example of the first embodiment, the acoustic damping composition has a Mode 3 Damping Parameter of at least 0.27, such as at least 0.31. In an additional example of the first embodiment, the acoustic damping composition has a Mode 1 Damping Performance of at least 20% or a Mode 2 Damping Performance of at least 20%.

In an additional example of the first embodiment, the acoustic damping composition has an STC Performance of at least 10, such as at least 11, or even at least 12.

In a further example of the first embodiment, the acoustic damping composition has a haze of at least 30%, such as at least 50%. In an additional example, the binder resin and the urethane component are included in a water-based emulsion and the urethane component and the binder resin may form separate phases.

In another example of the first embodiment, the binder resin includes an acrylic component.

In a second embodiment, a construction panel includes first and second rigid panels and an acoustic damping composition disposed between the first and second rigid panels. The acoustic damping composition includes a urethane component and a binder resin including an addition polymer having a carboxylic functional group. The acoustic damping composition has a Mode 1 Damping Parameter of at least 0.45.

In an example of the second embodiment, the first and second rigid panels include drywall. In a further example of the second embodiment, the Mode 1 Damping Parameter is at least 0.5, the Mode 2 Damping Parameter is at least 0.27, or the Mode 3 Damping Parameter is at least 0.27.

In a third embodiment, a method of preparing a construction panel includes applying an acoustic damping composition to a first major surface of a first rigid panel and contacting a first major surface of a second panel to the acoustic damping composition to form a construction panel. The acoustic damping composition includes a urethane component and a binder resin including an addition polymer having a carboxylic functional group. The acoustic damping composition has a Mode 1 Damping Parameter of at least 0.45. For example, the Mode 1 Damping Parameter may be at least 0.5. In another example of the third embodiment, the Mode 2 Damping Parameter is at least 0.27 or the Mode 3 Damping Parameter is at least 0.27.

In a fourth embodiment, an acoustic damping composition includes a binder resin including an addition polymer having a carboxylic functional group and a urethane component. The acoustic damping composition has a Mode 1 Damping Performance of at least 20%.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. An acoustic damping composition comprising:
   a binder resin including an addition polymer having a carboxylic functional group; and
   a modifying resin comprising a urethane component;
   wherein the acoustic damping composition has a Mode 1 Damping Parameter of at least 0.45.

2. The acoustic damping composition of claim 1, wherein the Mode 1 Damping Parameter is at least 0.5.

3. The acoustic damping composition of claim 2, wherein the Mode 1 Damping Parameter is at least 0.55.

4. The acoustic damping composition of claim 1, wherein the acoustic damping composition has a Mode 2 Damping Parameter of at least 0.27.

5. The acoustic damping composition according to claim 4, wherein the Mode 2 Damping parameter is at least 0.30".

6. The acoustic damping composition of claim 1, wherein the acoustic damping composition has a Mode 3 Damping Parameter of at least 0.27.

7. The acoustic damping composition of claim 1, wherein the acoustic damping composition has a Mode 1 Damping Performance of at least 20%.

8. The acoustic damping composition of claim1, wherein the acoustic damping composition has a Mode 2 Damping Performance of at least 20%.

9. The acoustic damping composition of claim 1, wherein the acoustic damping composition has an STC Performance of at least 10.

10. The acoustic damping composition of claim 1, wherein the acoustic damping composition has a haze of at least 30%.

11. The acoustic damping composition of claim 10, wherein the haze is at least 50%.

12. The acoustic damping composition of claim 1, wherein the binder resin and the urethane component are included in a water-based emulsion.

13. The acoustic damping composition of claim 1, wherein the urethane component and the binder resin form separate phases.

14. The acoustic damping composition of claim 1, wherein the binder resin includes an acrylic component.

15. A construction panel comprising:
   first and second rigid panels; and
   an acoustic damping composition disposed between the first and second rigid panels, the acoustic damping composition comprising a binder resin including an addition polymer having a carboxylic functional group and a modifying resin comprising a urethane component;
   wherein the acoustic damping composition has a Mode 1 Damping Parameter of at least 0.45.

16. The construction panel of claim 15, wherein the first and second rigid panels include drywall.

17. The construction panel of claim 15, wherein the Mode 1 Damping Parameter is at least 0.5.

18. The construction panel of claim 15, wherein the acoustic damping composition has a Mode 2 Damping Parameter of at least 0.27.

19. The construction panel of claim 15, wherein the acoustic damping composition has a Mode 3 Damping Parameter of at least 0.27.

20. An acoustic damping composition comprising:
   a binder resin including an addition polymer having a carboxylic functional group; and
   a modifying resin comprising a urethane component;
   wherein the acoustic damping composition has a Mode 1 Damping Performance of at least 20%.

* * * * *

UNITED STATES PATENT AND TRADEMARK OFFICE
CERTIFICATE OF CORRECTION

| | | |
|---|---|---|
| PATENT NO. | : 8,028,800 B2 | |
| APPLICATION NO. | : 12/757723 | |
| DATED | : October 4, 2011 | |
| INVENTOR(S) | : Brian Ravnaas | |

It is certified that error appears in the above-identified patent and that said Letters Patent is hereby corrected as shown below:

On the Title Page, Item (73) Assignee, please delete "SAINT-GOBAIN PERFORMANCE PLASTICS RENCOL LIMINITED, Bristol, (GB)" and insert therefor --SAINT-GOBAIN PERFORMANCE PLASTICS CORPORATION, Aurora, OH 44202--.

Signed and Sealed this
Twelfth Day of March, 2013

Teresa Stanek Rea
*Acting Director of the United States Patent and Trademark Office*